(12) United States Patent
James et al.

(10) Patent No.: US 8,799,201 B2
(45) Date of Patent: Aug. 5, 2014

(54) METHOD AND SYSTEM FOR TRACKING OBJECTS

(75) Inventors: Michael Robert James, Northville, MI (US); Michael Edward Samples, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 420 days.

(21) Appl. No.: 13/190,193

(22) Filed: Jul. 25, 2011

(65) Prior Publication Data

US 2013/0031045 A1    Jan. 31, 2013

(51) Int. Cl.
*G06N 7/00*     (2006.01)
*G06N 99/00*    (2010.01)
*G06T 7/20*     (2006.01)
*G06F 17/00*    (2006.01)

(52) U.S. Cl.
CPC .............. *G06N 7/005* (2013.01); *G06N 99/005* (2013.01); *G06T 7/2006* (2013.01); *G06T 2207/20076* (2013.01)
USPC ......................................................... 706/45

(58) Field of Classification Search
CPC .... G06N 7/005; G06N 99/005; G06T 7/2006; G06T 2207/20076
See application file for complete search history.

(56) References Cited

U.S. PATENT DOCUMENTS

| | | | |
|---|---|---|---|
| 2,903,002 A | 9/1959 | Adkins | 134/161 |
| 3,430,851 A | 3/1969 | Abt | 494/2 |
| 3,658,249 A | 4/1972 | Sharpe | 239/125 |
| 4,924,418 A | 5/1990 | Bachman et al. | 702/188 |
| 4,949,277 A | 8/1990 | Trovato et al. | 700/255 |
| 5,006,988 A | 4/1991 | Borenstein et al. | 701/25 |
| 5,170,352 A | 12/1992 | McTamaney et al. | 701/26 |
| 5,277,208 A | 1/1994 | Mansur | 134/56 R |
| 5,423,340 A | 6/1995 | Campbell et al. | 134/110 |
| 5,487,117 A | 1/1996 | Burges et al. | 382/173 |

(Continued)

FOREIGN PATENT DOCUMENTS

| | | |
|---|---|---|
| BR | 200705114 | 6/2009 |
| DE | 10037849 | 2/2002 |

(Continued)

OTHER PUBLICATIONS

Dung at al., "Mixed Reinforcement Learning for Partially Observable Markov Decision Process," Proceedings of the 2007 IEEE International Symposium on Computational Intelligence in Robotics and Automation, pp. 7-12, Jun. 2007.

(Continued)

*Primary Examiner* — Jeffrey A Gaffin
*Assistant Examiner* — Mikayla Chubb
(74) *Attorney, Agent, or Firm* — Gifford, Krass, Sprinkle, Anderson & Citkowski, P.C.

(57) ABSTRACT

An object tracking system and method operable to minimize processing time for tracking objects is provided. The system includes a pair of filters operable to make associations between dynamic objects newly detected and previously detected. One of the pair of filters makes an association when the predicted location of the previously detected objects is within a predetermined distance of the newly detected object. The other of the pair of filters makes an association based upon the probability that a newly detected dynamic object is a previously detected dynamic object. The remaining unassociated dynamic objects are then localized so as to form discrete matrices for optimization filters.

15 Claims, 6 Drawing Sheets

(56) References Cited

U.S. PATENT DOCUMENTS

| | | | |
|---|---|---|---|
| 5,508,689 A | 4/1996 | Rado et al. | 340/3.1 |
| 5,544,282 A | 8/1996 | Chen et al. | 700/255 |
| 5,644,386 A | 7/1997 | Jenkins et al. | 356/4.01 |
| 5,680,313 A | 10/1997 | Whittaker et al. | 701/300 |
| 5,696,674 A | 12/1997 | Trovato et al. | 345/473 |
| 5,870,303 A | 2/1999 | Trovato et al. | 700/61 |
| 5,954,071 A | 9/1999 | Magliocca | 134/109 |
| 6,018,308 A | 1/2000 | Shirai | 342/70 |
| 6,026,189 A | 2/2000 | Greenspan | 382/226 |
| 6,108,597 A | 8/2000 | Kirchner et al. | 701/23 |
| 6,111,521 A | 8/2000 | Mulder et al. | 340/905 |
| 6,173,066 B1 | 1/2001 | Peurach et al. | 382/103 |
| 6,205,380 B1 | 3/2001 | Bauer et al. | 701/23 |
| 6,236,749 B1 | 5/2001 | Satonaka et al. | 382/154 |
| 6,252,520 B1 | 6/2001 | Asami et al. | 340/903 |
| 6,259,377 B1 | 7/2001 | Noecker et al. | 340/933 |
| 6,324,135 B1 | 11/2001 | Kim et al. | 369/47.17 |
| 6,336,128 B1 | 1/2002 | Eisenmann et al. | 709/200 |
| 6,359,552 B1 | 3/2002 | King | 340/436 |
| 6,405,877 B1 | 6/2002 | Nemedi et al. | 210/498 |
| 6,421,463 B1 | 7/2002 | Poggio et al. | 382/224 |
| 6,445,308 B1 | 9/2002 | Koike | 340/902 |
| 6,470,271 B2 | 10/2002 | Matsunaga | 701/301 |
| 6,608,913 B1 | 8/2003 | Hinton et al. | 382/104 |
| 6,677,941 B2 | 1/2004 | Lin | 345/419 |
| 6,714,127 B2 | 3/2004 | Perez et al. | 340/467 |
| 6,728,607 B1 | 4/2004 | Anderson | 701/25 |
| 6,728,608 B2 | 4/2004 | Ollis et al. | 701/28 |
| 6,765,495 B1 | 7/2004 | Dunning et al. | 340/903 |
| 6,766,037 B1 | 7/2004 | Le et al. | 382/107 |
| 6,775,396 B2 | 8/2004 | Matsunaga | 382/106 |
| 6,799,100 B2 | 9/2004 | Burns et al. | 701/25 |
| 6,823,261 B2 | 11/2004 | Sekiguchi | 701/301 |
| 6,826,293 B2 | 11/2004 | Matsunaga | 382/106 |
| 6,845,324 B2 | 1/2005 | Smith | 702/3 |
| 6,850,824 B2 | 2/2005 | Breed | 701/36 |
| 6,861,957 B2 | 3/2005 | Koike | 340/903 |
| 6,944,543 B2 | 9/2005 | Prakah-Asante et al. | 701/301 |
| 6,988,026 B2 | 1/2006 | Breed et al. | 701/29 |
| 7,054,505 B2 | 5/2006 | Shyu | 382/281 |
| 7,084,882 B1 | 8/2006 | Dorum et al. | 345/589 |
| 7,146,991 B2 | 12/2006 | Stockert | 134/57 R |
| 7,149,660 B2 | 12/2006 | Kuehn et al. | 702/188 |
| 7,206,677 B2 | 4/2007 | Hulden | 701/23 |
| 7,218,758 B2 | 5/2007 | Ishii et al. | 382/104 |
| 7,239,956 B2 | 7/2007 | Sonoda et al. | 701/111 |
| 7,248,968 B2 | 7/2007 | Reid | 701/301 |
| 7,263,412 B2 | 8/2007 | Gutmann et al. | 700/245 |
| 7,263,509 B2 | 8/2007 | Lee et al. | 706/47 |
| 7,317,417 B2 | 1/2008 | Arikan et al. | 342/95 |
| 7,343,039 B2 | 3/2008 | Liu et al. | 382/170 |
| 7,363,515 B2 | 4/2008 | Frazier et al. | 703/2 |
| 7,386,163 B2 | 6/2008 | Sabe et al. | 382/153 |
| 7,421,415 B2 | 9/2008 | Dong et al. | 706/12 |
| 7,447,593 B2 | 11/2008 | Estkowski et al. | 701/301 |
| 7,467,034 B2 | 12/2008 | Breed et al. | 701/29 |
| 7,477,780 B2 | 1/2009 | Boncyk et al. | 382/165 |
| 7,480,414 B2 | 1/2009 | Brown et al. | 382/224 |
| 7,496,449 B2 | 2/2009 | Samukawa et al. | 701/301 |
| 7,532,130 B2 | 5/2009 | Curtis | 340/902 |
| 7,539,557 B2 | 5/2009 | Yamauchi | 700/245 |
| 7,558,762 B2 | 7/2009 | Owechko et al. | 706/14 |
| 7,598,848 B2 | 10/2009 | Takagi et al. | 340/436 |
| 7,639,841 B2* | 12/2009 | Zhu et al. | 382/104 |
| 7,659,835 B2 | 2/2010 | Jung | 340/932.2 |
| 7,660,649 B1 | 2/2010 | Hope et al. | 700/295 |
| 7,706,944 B2 | 4/2010 | Tanaka et al. | 701/41 |
| 7,720,580 B2 | 5/2010 | Higgins-Luthman | 701/28 |
| 7,891,004 B1 | 2/2011 | Gelvin et al. | 726/26 |
| 7,929,730 B2* | 4/2011 | Huang et al. | 382/103 |
| 8,024,084 B2 | 9/2011 | Breed | 701/29 |
| 2002/0186146 A1 | 12/2002 | Mikhaylenko et al. | |
| 2002/0196975 A1 | 12/2002 | Cahill | |
| 2003/0122687 A1 | 7/2003 | Trajkovic et al. | |
| 2004/0158355 A1 | 8/2004 | Holmqvist et al. | |
| 2004/0246144 A1 | 12/2004 | Siegel et al. | |
| 2005/0002572 A1* | 1/2005 | Saptharishi et al. | 382/224 |
| 2005/0015201 A1 | 1/2005 | Fields et al. | |
| 2005/0088318 A1 | 4/2005 | Liu et al. | 340/902 |
| 2005/0093717 A1 | 5/2005 | Lilja | |
| 2005/0131581 A1 | 6/2005 | Sabe et al. | |
| 2005/0131629 A1 | 6/2005 | Ignatin | 701/200 |
| 2005/0157931 A1 | 7/2005 | Delashmit et al. | |
| 2005/0182534 A1 | 8/2005 | Legate et al. | 701/29 |
| 2005/0197775 A1 | 9/2005 | Smith | |
| 2005/0223176 A1 | 10/2005 | Peters | |
| 2005/0237224 A1 | 10/2005 | Gotfried | |
| 2005/0286767 A1 | 12/2005 | Hager et al. | |
| 2006/0025888 A1 | 2/2006 | Gutmann et al. | |
| 2006/0058931 A1 | 3/2006 | Ariyur et al. | |
| 2006/0103927 A1 | 5/2006 | Samukawa et al. | |
| 2006/0110029 A1 | 5/2006 | Kazui et al. | |
| 2006/0161335 A1 | 7/2006 | Beinhaker | |
| 2006/0200333 A1 | 9/2006 | Dalal et al. | |
| 2006/0222205 A1* | 10/2006 | Porikli et al. | 382/103 |
| 2006/0241827 A1 | 10/2006 | Fukuchi et al. | |
| 2006/0262007 A1 | 11/2006 | Bonthron et al. | |
| 2006/0271254 A1 | 11/2006 | Shah et al. | 701/29 |
| 2007/0036434 A1* | 2/2007 | Saveliev | 382/173 |
| 2007/0043502 A1 | 2/2007 | Mudalige et al. | |
| 2007/0080825 A1 | 4/2007 | Shiller | |
| 2007/0127816 A1 | 6/2007 | Balslev et al. | |
| 2007/0156312 A1 | 7/2007 | Breed et al. | |
| 2007/0188349 A1 | 8/2007 | Staniszewski | |
| 2007/0217676 A1 | 9/2007 | Grauman et al. | |
| 2007/0265741 A1 | 11/2007 | Oi et al. | |
| 2007/0280528 A1 | 12/2007 | Wellington et al. | 382/154 |
| 2007/0293985 A1 | 12/2007 | Myeong et al. | |
| 2008/0015777 A1 | 1/2008 | Heimberger et al. | |
| 2008/0021625 A1 | 1/2008 | Ohtomo | |
| 2008/0025568 A1 | 1/2008 | Han et al. | |
| 2008/0027591 A1 | 1/2008 | Lenser et al. | |
| 2008/0042895 A1 | 2/2008 | Inaba | |
| 2008/0046125 A1 | 2/2008 | Myeong et al. | |
| 2008/0074312 A1 | 3/2008 | Cross et al. | |
| 2008/0077294 A1 | 3/2008 | Danz et al. | |
| 2008/0187227 A1 | 8/2008 | Bober et al. | |
| 2008/0208778 A1 | 8/2008 | Sayyar-Rodsari et al. | |
| 2008/0243439 A1 | 10/2008 | Runkle et al. | |
| 2008/0284575 A1 | 11/2008 | Breed | |
| 2009/0043462 A1 | 2/2009 | Stratton et al. | |
| 2009/0067730 A1 | 3/2009 | Schneiderman | |
| 2009/0103779 A1 | 4/2009 | Loehlein et al. | |
| 2009/0149990 A1 | 6/2009 | Myeong et al. | |
| 2009/0171567 A1 | 7/2009 | Morimoto et al. | |
| 2009/0192955 A1 | 7/2009 | Tang et al. | |
| 2009/0210362 A1 | 8/2009 | Xiao et al. | |
| 2009/0245573 A1* | 10/2009 | Saptharishi et al. | 382/103 |
| 2009/0310867 A1 | 12/2009 | Matei et al. | |
| 2010/0017115 A1 | 1/2010 | Gautama | |
| 2010/0023251 A1 | 1/2010 | Gale et al. | |
| 2010/0046799 A1* | 2/2010 | Saptharishi et al. | 382/103 |
| 2010/0092073 A1 | 4/2010 | Prokhorov | |
| 2010/0299013 A1 | 11/2010 | Dolgov et al. | |
| 2011/0169625 A1 | 7/2011 | James et al. | |

FOREIGN PATENT DOCUMENTS

| | | |
|---|---|---|
| DE | 10148063 | 4/2003 |
| DE | 102010001383 | 8/2011 |
| FR | 2955893 | 8/2001 |
| JP | 51148076 | 12/1976 |
| JP | 647353 | 2/1994 |
| JP | 985189 | 3/1997 |
| JP | 10283478 | 10/1998 |
| JP | 10293478 | 11/1998 |
| JP | 2001-301485 | 10/2001 |
| JP | 2002303671 | 10/2002 |
| JP | 2006011880 | 1/2006 |
| JP | 200648568 | 2/2006 |
| JP | 2006047353 | 2/2006 |
| JP | 2006048568 | 2/2006 |

(56) References Cited

FOREIGN PATENT DOCUMENTS

| JP | 2007142517 | 6/2007 |
|----|------------|--------|
| KR | 20040053912 | 6/2004 |
| WO | WO2009076214 | 6/2009 |

OTHER PUBLICATIONS

Theocharous at al., "Approximate Planning with Hierarchical Partially Observable Markov Decision Process Models for Robot Navigation," Proceedings of the 2002 IEEE International Conference on Robotics and Automation, pp. 1347-1352,May 2002.
James et al., "SarsaLandmark: An Algorithm for Learning in POMDPs with Landmarks," Proceedings of 8th International Conference on Autonomous Agents and Multiagent Systems (AAMAS 2009), pp. 585-592, May 2009.
Peters et al., "Acquisition of Topological Action Maps through Teleoperation," Proceedings of the 2004 IEEE International Conference on Robotics & Automation, Apr. 2004, pp. 4565-4570.
Anguelov et al., "Discriminative Learning of Markov Random Fields for Segmentation of 3D Scan Data," Proceedings of the 2005 IEEE Computer Society Conference on Computer Vision and Pattern Recognition (CVPR '05), 2005, pp. 1-8.
Bache et al., "Odin: Team VictorTango's Entry in the DARPA Urban Challenge," Journal of Field Robotics 25(8), 2008, pp. 467-492.
Bradski et al., Learning Open CV: Computer Vision with the OpenCV Library, Sep. 24, 2008; Table of Contents, 4 pages; Chapter 13, Sections 13.6-13.8.2, 25 pages.
Dahlkamp et al., "Self-supervised Monocular Road Detection in Desert Terrain," Robotics: Science and Systems, 2006, 7 pages.
Diebel at al., "An Application of Markov Random Fields to Range Sensing," Proceedings of Conference on Neural Information Processing Systems (NIPS), 2005, 8 pages.
Frome et al., "Recognizing Objects in Range Data Using Regional Point Descriptors," Proceedings of the European Conference on Computer Vision (ECCV), May 2004, 14 pages.
Hadsell et al., "Accurate Rough Terrain Estimation with Space-Carving Kernels," Proceedings of Science and Systems, Jun. 2009, 8 pages.
Johnson, et al., "Using Spin Images for Efficient Object Recognition in Cluttered 3D Scenes," IEEE Transactions on Pattern Analysis and Machine Intelligence, vol. 21, No. 5, May 1999, pp. 433-449.
Lu at al., "A Hybrid Conditional Random Field for Estimating the Underlying Ground Surface from Airborne LiDAR Data," IEEE Transactions on Geoscience and Remote Sensing, vol. 47, Issue 8, Jul. 2009, 11 pages.
Montemerlo et al., "Junior. The Stanford Entry in the Urban Challenge," Journal of Field Robotics, 25(9), 2008, pp. 569-597.
Munoz et al., "Contextual Classification with Functional Max-Margin Markov Networks," IEEE Computer Society Conference on Computer Vision and Pattern Recognition (CVPR), Jun. 2009, 8 pages.
Sithole et al., "Experimental comparison of filter algorithms for bare-Earth extraction from airborne laser scanning point clouds," ISPRS Journal of Photogrammetry and Remote Sensing, 59, 2004, pp. 85-101.
Urmson et al., "Autonomous Driving in Urban Environments: Boss and the Urban Challenge," Journal of Field Robotics 25(8), 2008, pp. 425-466.
Wellington et al., "A Generative Model of Terrain for Autonomous Navigation in Vegetation," The International Journal of Robotics Research, 25(12), 2006, 15 pages.
Winkler, Image Analysis, Random Fields and Dynamic Monte Carlo Methods: A Mathematical Introduction, 2003, pp. 47-61.
Wolf et al., "Autonomous Terrain Mapping and Classification Using Hidden Markov Models,"Proceedings of the IEEE International Conference on Robotics and Automation (ICRA), 2005, pp. 2038-2043.
Diesel Engine Online Monitoring Based on Smart Order Tracking Sensor System; Cheng Lijun; Zhang Yingtang; Li Zhining; Ren Guoquan; Li Jianwei; Measuring Technology and Mechatronics Automation (ICMTMA), 2011 Third International Conference on vol. 1; Digital Object Identifier: 10.1109/ICMTMA.2011.270; Publication Year: 2011, pp. 1079-1082.
Cooperative Maneuvering in Close Environments Among Cybercars and Dual-Mode Cars; Milanes, V., Alonso, J.; Bouraoui, L.; Ploeg, J.; Intelligent Transportaion Systems, IEEE Transactions on; vol. 12, Issue: 1; Digital Object Identifier: 10.1109/TITS.2012.2050060; Publication Year: 2011, pp. 15-24.
Extrinsic calibration between a multi-layer lidar and a camera; Rodriguez F, S.A.; Fremont, V,; Bonnifait, P.; Multisensor Fusion and Integration for Intelligent Systems, 2008, MFI 2008. IEEE International Conference on; Digital Object Identifier: 10.1109/MFI.2008.4648067; Publication Year: 2008, pp. 214-219.
Study of Control Algorithm for Smart Car System; Ruixian Li; Information and Computing (ICIC), 2011 Fourth International Conference on; Digital Object Identifier: 10.1109/ICIC.2011.113; Publication Year: 2011, pp. 184-187.
A Comparitive Study of Different Sensors for Smart Car Park Management; Kumar, R.; Chilamkurti, N.K.; Ben Soh; Intelligent Pervasive Computing, 2007. IPC. The 2007 International Conference on; Digital Object Identifier 10.1109/IPC.2007.29 Publication Year: 2007, pp. 499-502.
Multipriority video transmission for third-generation wireless communication systems; Gharavi, H.; Alamouti, S.M.; Proceedings of the IEEE; vol. 87, Issue: 10; Digital Object Identifier; 10.1109/5.790635 Publication Year: 1999, p. 9s): 1751-1763.
The ENVISAT data products; Levrini, G.; Brooker, G.;Geoscience and Remote Sensing Symposium, 2000, Proceedings. IGARSS 2000. IEEE 2000 International; vol. 3; Digital Object Identifier: 10.1109/IGARSS.2000.858066 Publication Year: 2000, pp. 1198-1201 vol. 3.
A methodological framework for integrated control in corridor networks; Pavlis, Y.; Recker, W.; Intelligent Transportation Systems, 2001. Proceedings. 2001 1EEE; Digital Object Identifier: 10.1109/ITSC.2001.948734; Publication Year: 2001, pp. 637-642.
Adaptive and cooperative multi-agent fuzzy system architecture; Daneshfar, F.; Akhlaghian, F.; Mansoori, F.; Computer Conference, 2009. CSICC 2009. 14th International CSI; Digital Object Identifier 10.1109/CSICC.2009.5349439 Publication Year: 2009, pp. 30-34.
Freund, Yoav et al., "A Short Introduction to Boosting," Journal of Japanese Society for Artificial Intelligence, vol. 14, No. 5, pp. 771-780, Sep. 1999.
U.S. Appl. No. 12/252,080, filed Oct. 15, 2008, Inventor: Danil V. Prokhorov.
International Search Report Issued Dec. 22, 2011 in corresponding PCT/US11/47153.
Mobileye NV. Feb. 2004, , Pedestrian Protection Two Pages.
Premebida et al., A Lidar and Vision-based Approach for Pedestrian and Vehicle Detection and Tracking, Proceedings of the 2007 IEEE, Intelligent Transportation Systems Conference Seattle, WA, USA, Sep. 30-Oct. 3, 2007 pp. 1044-1049.
Takagi Kiyokazu, Pedestrian Recognition Using on-vehicle LIDAR, Science Links Japan, Gateway to Japan's Scientific and Technical Information, 2006-2007 Japan Science and Technology Agency.

* cited by examiner

METHOD AND SYSTEM FOR TRACKING OBJECTS

FIELD OF THE INVENTION

The invention relates to a system and method for tracking objects. More particularly the invention relates to a system and method for tracking objects by using filters to make associations with objects, localizing objects, and processing the remaining objects using an optimization filter.

BACKGROUND OF THE INVENTION

Object tracking systems are currently known and used. A limitation with current systems is the processing of information in a timely manner. Generally speaking, object tracking systems use a sensor such as radar or lidar to acquire data about an object that is detected within a predetermined range. The information is processed to calculate velocity vectors for each object so as to predict the location of the object in a predetermined time interval. The systems take another set of data so as to locate objects and then run an optimization filter to determine if the detected objects are associated with any one of the previously detected objects. Thus the system tracks objects in the predetermined area.

The information gathered by these sensors may be run through optimization filters which generate matrices associating each object with a previously detected object based upon factors such as the predicted location of the previously detected object, the color of the previously detected object, the height of the previously detected object, and the like. However, processing such matrices may be time consuming and inhibit the timeliness and effectiveness of current systems. Current platforms overcome these limitations by implementing hardware having robust processing speed and memory. However, such a countermeasure adds costs to implementation.

Accordingly it remains desirable to have an object tracking system which overcomes the limitations of the current art without having to increase the robustness of the hardware for processing such information.

SUMMARY OF THE INVENTION

According to one aspect of the invention an object tracking system is provided. The object tracking system is operable to minimize processing time for tracking objects. The system includes a sensor operable to detect objects in a predetermined geographic area. The system detects objects at predetermined intervals so as to define a first object group from the previous interval existing at the beginning of the predetermined interval and a second object group detected at the end of the predetermined interval. The system is operable to repeat the intervals so as to perform tracking operations.

The system further includes a processor in communication with the sensor. The processor is operable to determine which of the objects may be dynamic so as to generate the second group. The processor is further operable to process information from the first group to predict the location for each of the dynamic objects. More specifically the processor is operable to predict where each of the dynamic location objects will be at the end of the predetermined interval. The predictions may be based upon the detected object's vector.

The system further includes a pair of filters operable to make associations between dynamic objects from the first group and objects from the second group so as to track the dynamic objects within a geographic area. The processor processes the predicted location of dynamic objects from the first group and objects from the second group through the pair of filters.

One of the pair of filters makes art association between objects from the second group as being a dynamic object from the first group when the predicted location of the previously detected objects is within a predetermined distance of objects from the second group. The other of the pair of filters considers all of the objects jointly and makes an association based upon the probability that the objects from the second group are the dynamic objects of the first group. More specifically the second filter uses the predicted location of all of the dynamic objects from the first group to compute the probability that the objects of the second group are any one of the predetermined predicted locations of the dynamic objects from the first group. When the probability that a dynamic object from the second group is a dynamic object from the first group is above a predetermined probability, the filter makes an association so as to track the dynamic objects from the second group as arriving from the location of the dynamic object of the first group.

The remaining unassociated dynamic objects are then localized so as to form discrete matrices. These discrete matrices are processed by an optimization filter. More specifically the discrete matrices are composed of unassociated dynamic objects from the second group and unassociated detected objects from the first group which have the probability of being associated. The remaining unassociated objects are further processed as being either discarded, meaning they have dropped from the range of the predetermined area, or as being new objects having entered the predetermined geographic area. The system is further operable to process the remaining unassociated objects into an optimization filter.

A method for tracking objects is also provided herein. The method includes the steps of: (1) generating a group of dynamic objects from the previous iteration; (2) predicting where each dynamic object will be after a predetermined time; (3) detecting objects within a predetermined geographic area after a predetermined time; (4) determining if any of the detected objects are within a predetermined distance of the predicted location of the dynamic objects; (5) associating any of the detected objects with the previously detected dynamic objects wherein the objects are within a predetermined distance of the predicted location of the previously detected objects; (6) associating any of the newly detected objects as being the previously detected objects when the probability of the newly detected object is above a predetermined probability that it is the previously detected object; (7) localizing the remaining unassociated dynamic objects with the previously unassociated detected objects; and (8) running an optimization filter for each of the localized groups of unassociated dynamic objects. Accordingly the use of localized groups for reducing the amount and the size of matrices for the optimization filters is used so as to reduce processing time for tracking objects.

BRIEF DESCRIPTION OF THE DRAWINGS

Advantages of the present invention will be readily appreciated as the same becomes understood by reference to the following detailed description when considered in connection with the accompanying figures wherein.

DETAILED DESCRIPTION OF THE INVENTION

Figure 2:
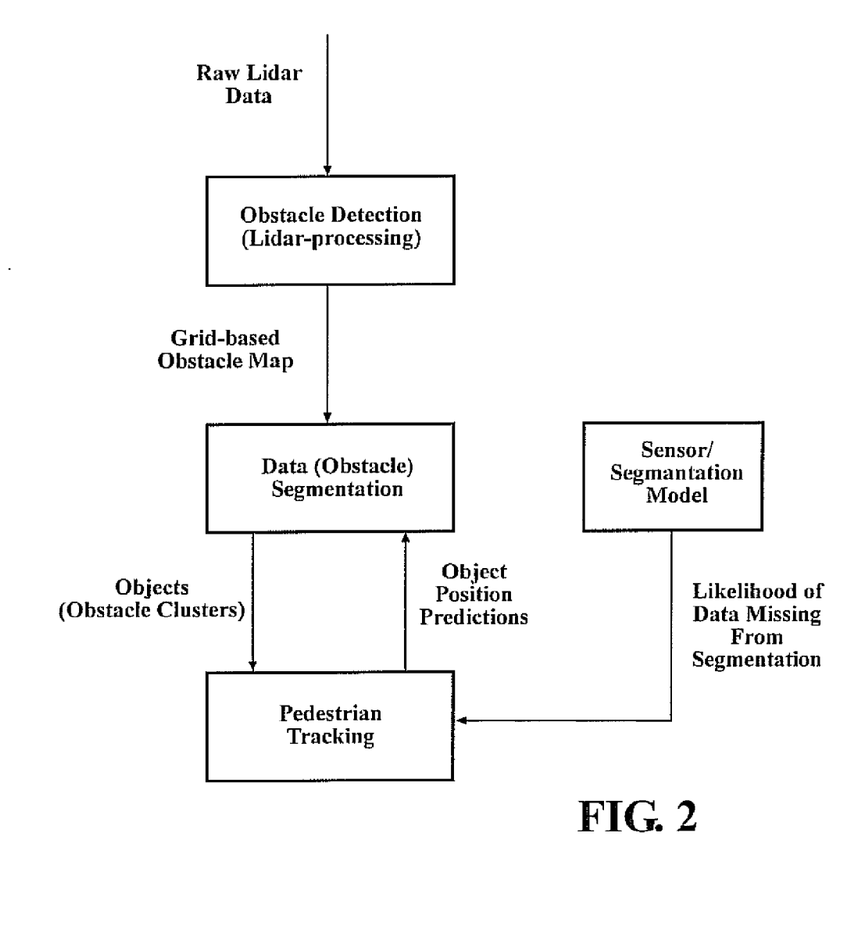
FIG. 2 is a diagram showing a tracking system of the present invention.
Figure 3:
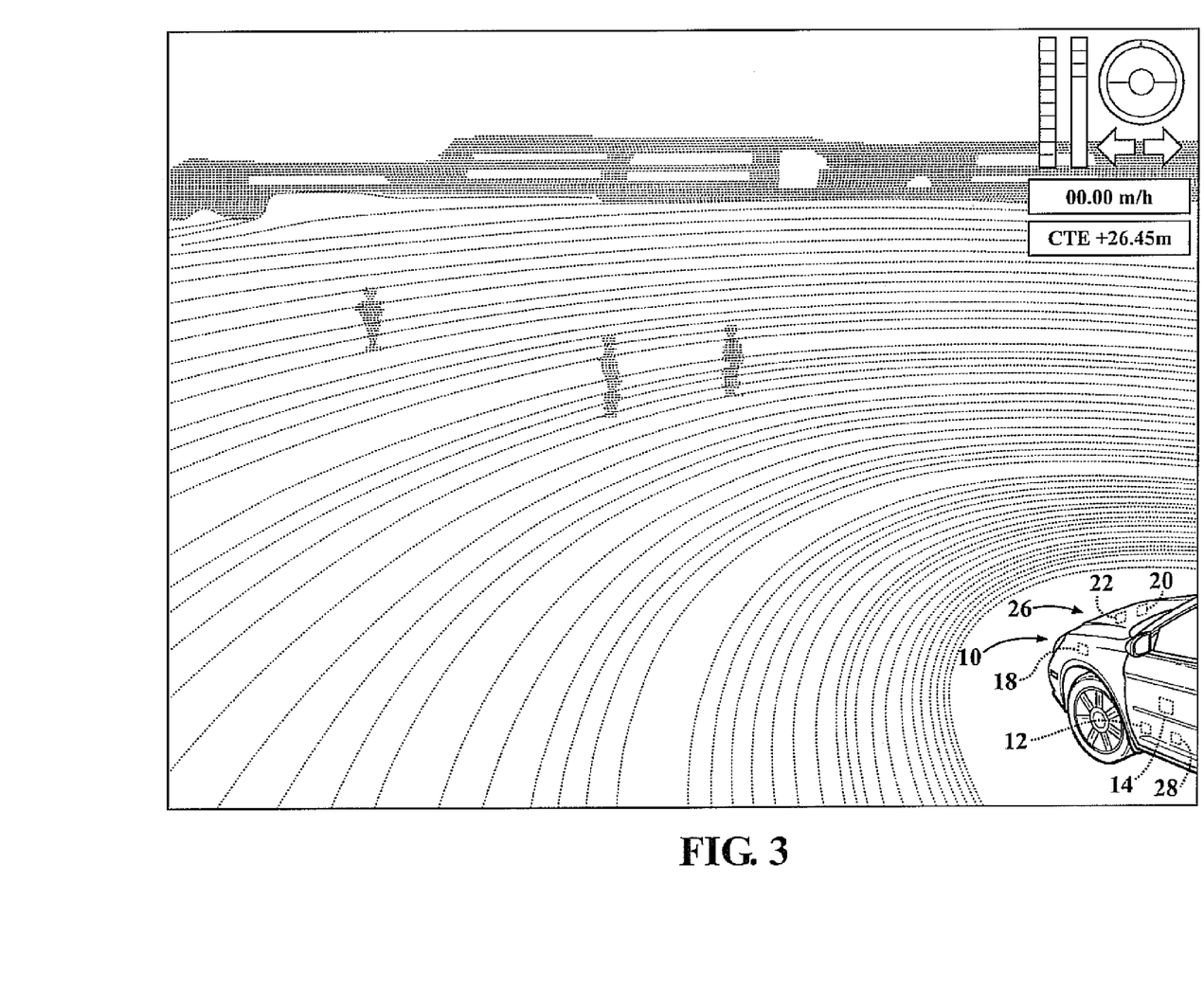
FIG. 3 is a perspective view of data gathered by a detection system.
Figure 4:
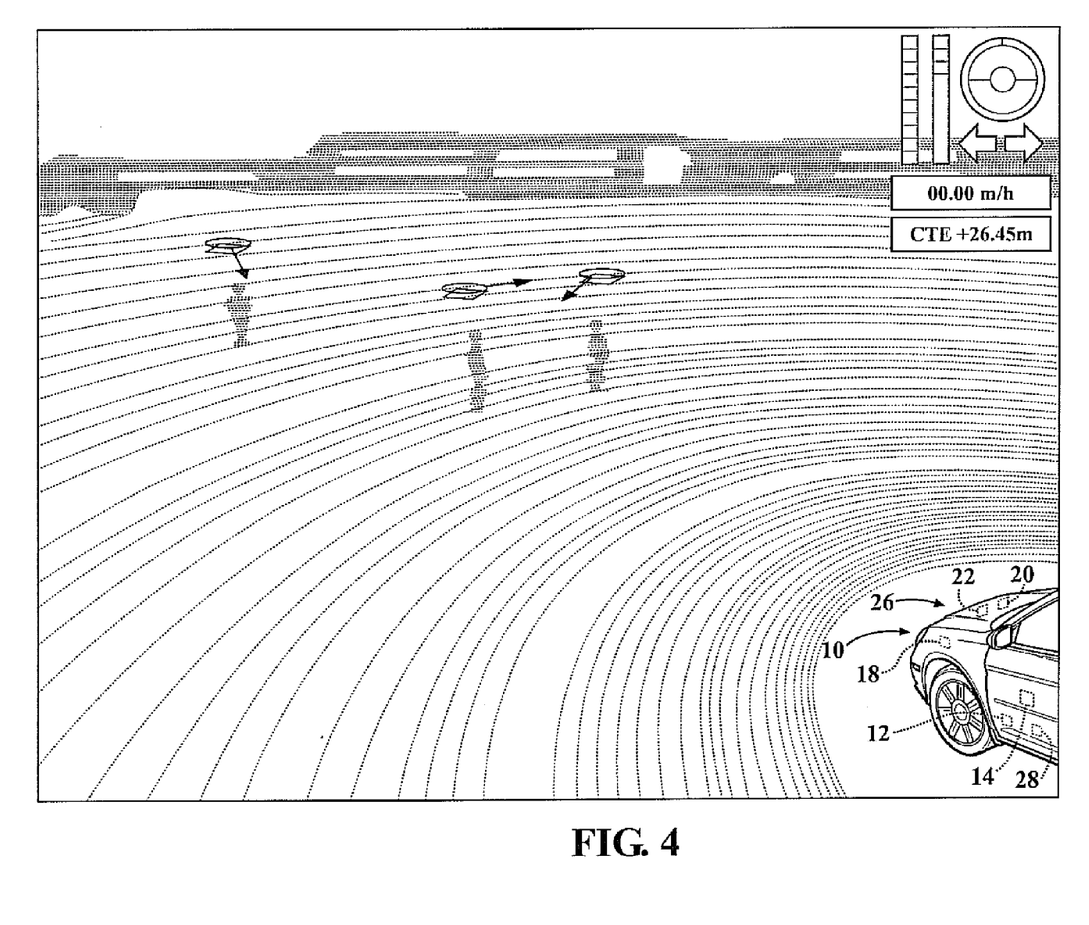
FIG. 4 is a perspective view of FIG. 3 after the data is processed to determine the velocity of dynamic objects, the velocity vector is indicated above each dynamic object.

Referring to FIGS. 2-4, a system 10 for detecting and tracking objects is provided. More specifically, the system 10 is operable to minimize processing time for tracking objects so as to provide information in a timely manner. The system 10 uses localized groups to reduce the matrix size processed by an optimization filter 12. Accordingly, the system 10 may be implemented without the need for robust hardware.

The system 10 includes a memory storage system 14 used for storing detected objects from the previous iteration so as to define a first object group of dynamic objects at the beginning of the predetermined interval. The memory storage system 14 may be an internal hard drive in electrical communication with a processor 18.

Figure 1:
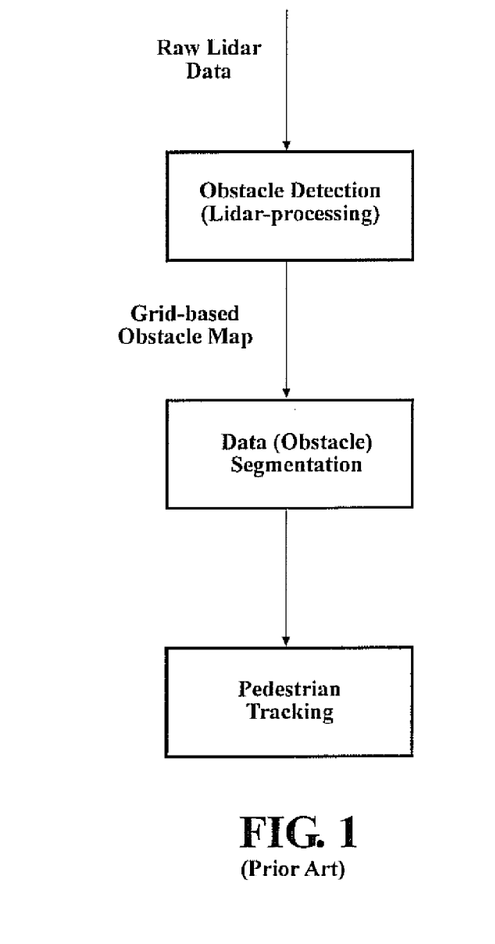
FIG. 1 is a diagram showing a prior art tracking system.

The system 10 includes a sensor 20 operable to detect objects within a predetermined geographic area. The system 10 is operable to detect these objects at a predetermined interval so as to define a cycle 22. The cycle 22 includes a first object group 16 (also referenced herein as previously detected objects) detected at the beginning of the predetermined interval and a second object group 24 (also referenced herein as newly detected objects) detected at the end of the predetermined interval. The sensor 20 is operable to provide the objects in the form of discrete points of data as shown in FIG. 1. Preferably the sensor 20 is a lidar sensor 20 or a radar sensor 20.

The processor 18 is in communication with the sensor 20. The processor 18 is operable to determine which of the objects are dynamic. Dynamic, as used herein, refers to an object having a vector or capable of being autonomously displaced. The processor 18 is further operable to predict the location for each of the dynamic objects in the first object group 16. More specifically the processor 18 is operable to predict where the objects of the first object group 16 will be at the end of the predetermined interval.

The processor 18 may use the size of the detected object so as to determine whether or not the object is dynamic. Determination of a dynamic object may further be refined so as to classify the dynamic object as being a pedestrian, a vehicle 26, or an animal. For instance the data points may be processed through a filter 12 which can profile the relationship of each data point with respect to the environment so as to determine whether the silhouette of the dynamic object fits one of either an animal, a pedestrian, a vehicle 26, or a fixed structure such as a building. Thus, objects which have a profile of a building are determined to be non-dynamic, whereas objects determined to be one of either an animal, a pedestrian, or a vehicle 26 is determined to be dynamic, regardless of whether the dynamic object has a vector.

With reference now to FIG. 3, the data gathered from each object in a first object group 16 (represented as discrete points). The first object group 16 may be processed so as to calculate the vector for each dynamic object, as shown in FIG. 4. The vectors are indicated generally by an arrow disposed above each of the dynamic objects. The predicted location of each dynamic object may be calculated based upon the velocity vector.

The processor 18 may be in further communication with a coordinate system 10 such as a global positioning system 10. The processor 18 may include a mapping module 28 so as to associate the detected objects with a respective coordinate on a map. The map may be generated and updated based upon the current location of the system 10. Accordingly, in applications such as a vehicle 26 platform, the predetermined area is not necessarily a fixed location.

The system 10 further includes a pair of filters 12 operable to perform association so as to associate dynamic objects from the first group with dynamic objects from the second group thereby tracking the dynamic objects. The processor 18 processes the predicted location of dynamic objects from the first group and objects from the second group through the pair of filters 12. One of the pair of filters 12 associates objects from the second group with the corresponding dynamic object from the first group when the predicted location of the dynamic objects from the first group is within a predetermined distance of the objects from the second group.

Figure 5A:
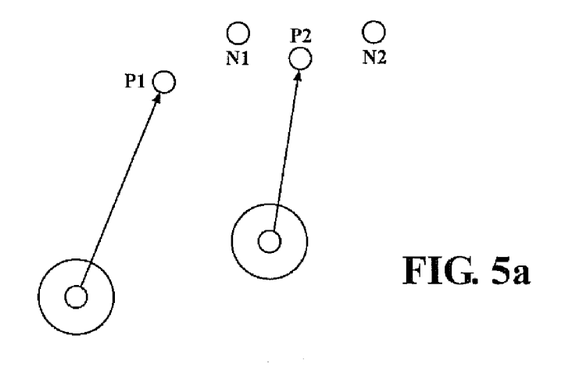
FIG. 5A is a perspective view of a cycle of object detection, showing the predicted location of dynamic objects from the first group and the detected objects in the second group.

With reference now to FIG. 5A, an example of an association with respect to distance is provided. P1 indicates the dynamic object from the first object group 16. The velocity vector shows the predicted location of P1 at the end of the predetermined interval. Likewise P2 represents a dynamic object detected in the first object group 16. P2 indicates the predicted location of the object at the end of the predetermined interval. As stated above, the predicted location may be based upon the vector information gathered from the sensor 20. Alternatively the predicted location may be gathered from a plurality of sensors 20. Association within a predetermined area may be done simply by establishing a predetermined area surrounding respective N1 and N2. In such a case, the system 10 makes an association between objects from the first and second groups 16, 24 when the predicted location of any of the dynamic objects from the first group fall within the predetermined distance of an object from the second group.

Assume that an association is made where a newly detected object is within 0.2 meters of the predicted location of a previously detected object. In this case, P1 (predicted location of a previously detected object) is 0.19 meters of N1 (newly detected object) and 0.5 meters of N2, and P2 is 0.1 meters from N2 and 0.4 meters from N1. Accordingly, the association may be made that N1 is P1 and N2 is P2.

Figure 5B:
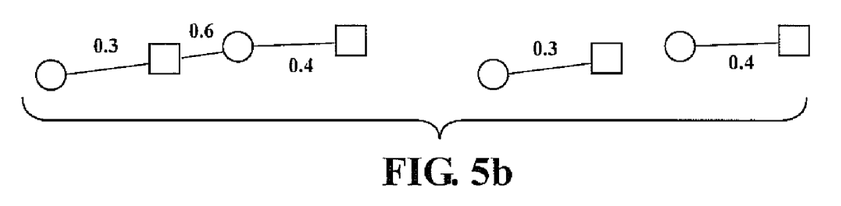
FIG. 5B is a diagram showing association between objects from the first group and second group using a weighted value.

However in cases where there are multiple objects being detected at one time, such an association strategy may an ineffective. Accordingly association may be conducted based upon weighted factors. With reference now to FIG. 5B, an example of association using weighted factors is provided. A weighted value may be assigned to the distances between the predicted locations and the detected objects. Using the above scenario, and assuming that the distance between P1 and N1 is 0.25 meters and P2 and N1 is also 0.25 meters but the distance between P2 and N2 is 0.3 meters, whereas the distance between P1 and N2 is 0.55 meter. In such a case, the distances are weighted so as to dismiss associations where the distance between a predicted location and a newly detected object is beyond a predetermined length. For instance, assuming that associations are dismissed when the predetermined length is 0.5 meters or longer, an association between P1 and N2 is dismissed. Accordingly, the system 10 associates P1 with N1 and P2 with N2.

The remaining unassociated objects are then processed through the second of the pair of filters 12. Associating dynamic objects from the first group with dynamic objects from the second group may also be based upon probability. For instance, the second pair of filters 12 associates each of the dynamic objects from the first object group 16 with one of the corresponding objects in the second object group 24 when the probability that the object from the second group is the dynamic object from the first group is greater than a predetermined probability.

For instance, assuming that the probability that P1 could be N2 is 10% and that the probability of P1 being N1 is 60% and that the probability of P2 being N1 is also 60%, the probability of P2 being N2 is 50%, the filter 12 may weight the probability of one being greater than the other. In such a case, since the probability of P1 being N2 is low relative to the probability that P2 is N2, the processor 18 may then assume that P1 is N1 and P2 is N2 even though the probability that P1 is N1 and that P2 is N1 is the same.

Association based upon probability and distance may be made in numerous ways, and the previous examples are provided for illustrative purposes and are not limiting. In certain instances, associations made through the pair of filters 12 does not associate every newly detected object with a previously detected object, thus certain objects are not tracked. The remaining unassociated objects are then further processed by a localization filter 12.

The localization filter 12 is operable to sort unassociated objects from second object groups 24 into a plurality of discrete categories. Preferably, the localization filter 12 uses association to associate unassociated objects from the second group with unassociated dynamic objects from the first group. In one embodiment, the localization filter 12 establishes a geographic boundary to perform localization.

Figure 7:
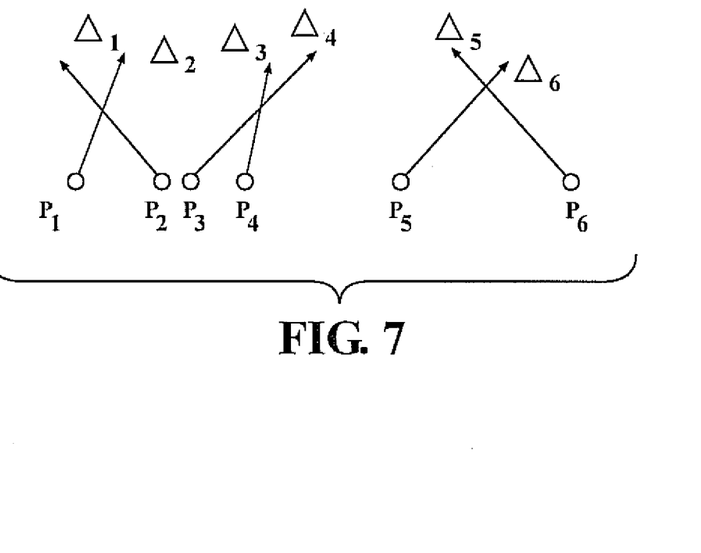
FIG. 7 is a diagram showing a detection cycle with multiple dynamic objects.

With reference to FIG. 7 the operation of the localization filter 12 is illustrated. The geographic boundary is divided into two segments. The segments may be based upon the probabilities of the objects being grouped together. Thus in this case, the probability that the objects on the right-hand side of the segments are now located on the left-hand side of the segments is remote. The processor 18 delineates a line so as to group the unassociated dynamic objects together.

Figure 8:
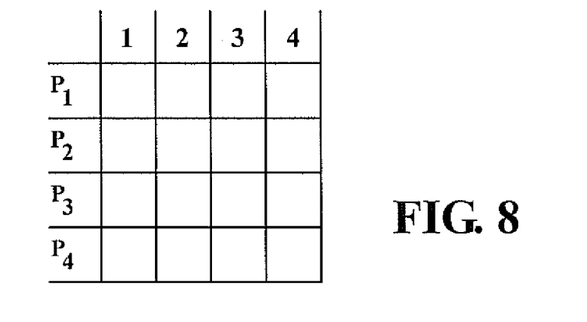
FIG. 8 is a discrete matrix wherein a portion of objects from FIG. 7 is localized before an optimization filter is executed.
Figure 9:
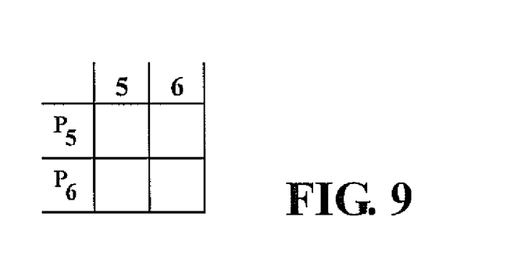
FIG. 9 is another discrete matrix wherein another portion of objects from FIG. 7 is localized before an optimization filter is executed.

With reference now to FIGS. 8 and 9, discrete matrices based upon localization are provided. With reference specifically to FIG. 8, a discrete matrix is formed. The localization filter 12 processes the data and determines that the possibility of either $P_5$ or $P_6$ being either $\Delta_1$, $\Delta_2$, $\Delta_3$ or $\Delta_4$ is remote. Accordingly, $P_1$, $P_2$, $P_3$ and $P_4$ are localized and processed in a discrete matrix. The system 10 is operable to execute an optimization filter 12 to process the discrete matrix and associate the newly detected objects with the previously detected objects.

With reference now to FIG. 9, the remaining unassociated objects are formed into another discrete matrix. Optimization filters 12 may be performed simultaneously for each of the localized groups 16, 24 of unassociated objects thereby reducing processing time for tracking objects. The localization filter 12 reduces processing time by breaking up the matrix. In this case the localization filter 12 forms one matrix of 2 by 2 and another matrix of 4 by 4 as opposed to a matrix of 6 by 6. As these two matrices have combined size 20 as opposed to the single matrix sized 36, the processing time is reduced and information may be provided timely. Additionally, many processors may be able to process both matrices simultaneously, and so reduce processing time further. In another example of localization, the localization filter 12 associates data from objects detected in the first object group 16 with objects detected in the second object group 24 when the predicted location of objects in the first group is within a predetermined distance of detected objects in the second group. Thus instead of segmentation of the geographic area, segmentation is done more dynamically. The processor 18 is further operable to gather the associated objects and update the objects within information gathered in succeeding detection cycles 22. Thus, objects within a geographic area may be tracked over a period of time.

The environment in which object tracking systems 10 are deployed is very fluid, meaning at any given time new objects may enter into the predetermined geographic area or may leave the predetermined geographic area. In cases where objects leave, an assumption may be made that an object left the geographic area based upon the velocity vector of the object and the predicted location of the object at a given time. However in some instances the predicted location of the object is not outside of the predetermined geographic area of the sensor 20. The system 10 further includes a counting module operable to help determine whether an unassociated object is missing. The counting module is operable to discard an unassociated object from further processing after a predetermined number of intervals. More specifically, if an object detected at the beginning of the predetermined interval is not accounted for in subsequent cycles 22, then the system 10 discards that object from further processing.

Figure 6:
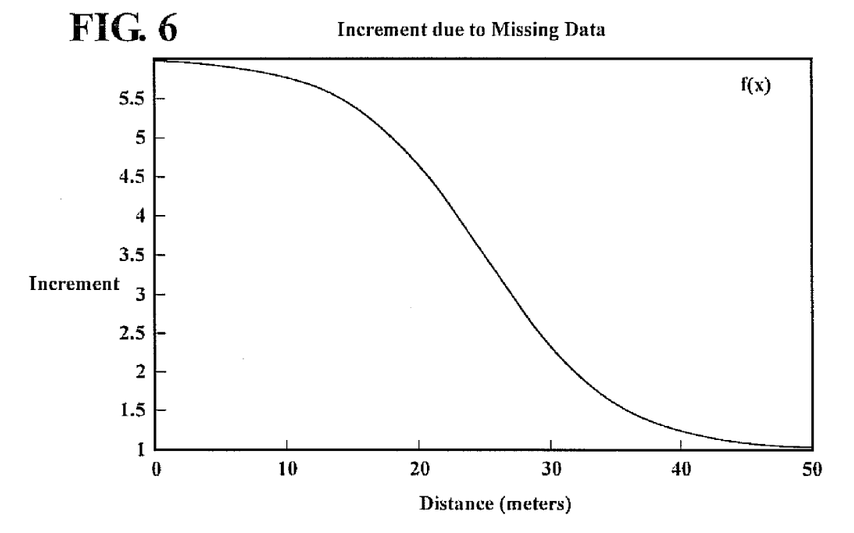
FIG. 6 is a diagram showing the relationship between a tracked dynamic object that becomes missing and the distance of the tracked dynamic object.

The counting module includes a threshold for discarding an unassociated object. The threshold is based upon the number of times the dynamic object was associated. Accordingly, the longer the object is tracked, the higher the threshold is prior to discarding. The count may also be weighted based upon the distance between the tracked object and the sensor 20. For instance, it is extremely unlikely that a pedestrian within close proximity will not be sensed due to noise. At long distances there is much more noise. Therefore, the threshold should be high at short distances and low at long distances as shown in FIG. 6. The cutoff is based on the following logic. If the pedestrian is relatively new, there is not much evidence that it is not noise and so the threshold is low. However, if the pedestrian has been tracked for some time, then the cutoff should be higher, the cutoff meaning the predetermined number of intervals prior to discarding the object from processing.

The system 10 further includes a segmentation module that is operable to provide an artificial dynamic object for each of the unassociated dynamic objects from the first and second object groups 16, 24. The segmentation module takes into account the fact that the objects may either move out of range of the predetermined geographic area or that new objects may come in. Thus the final association matrix includes an association for each object in the geographic area. In some cases these objects may be artificial dynamic objects having an association or may be based upon association or an optimization filter 12.

Figure 10:
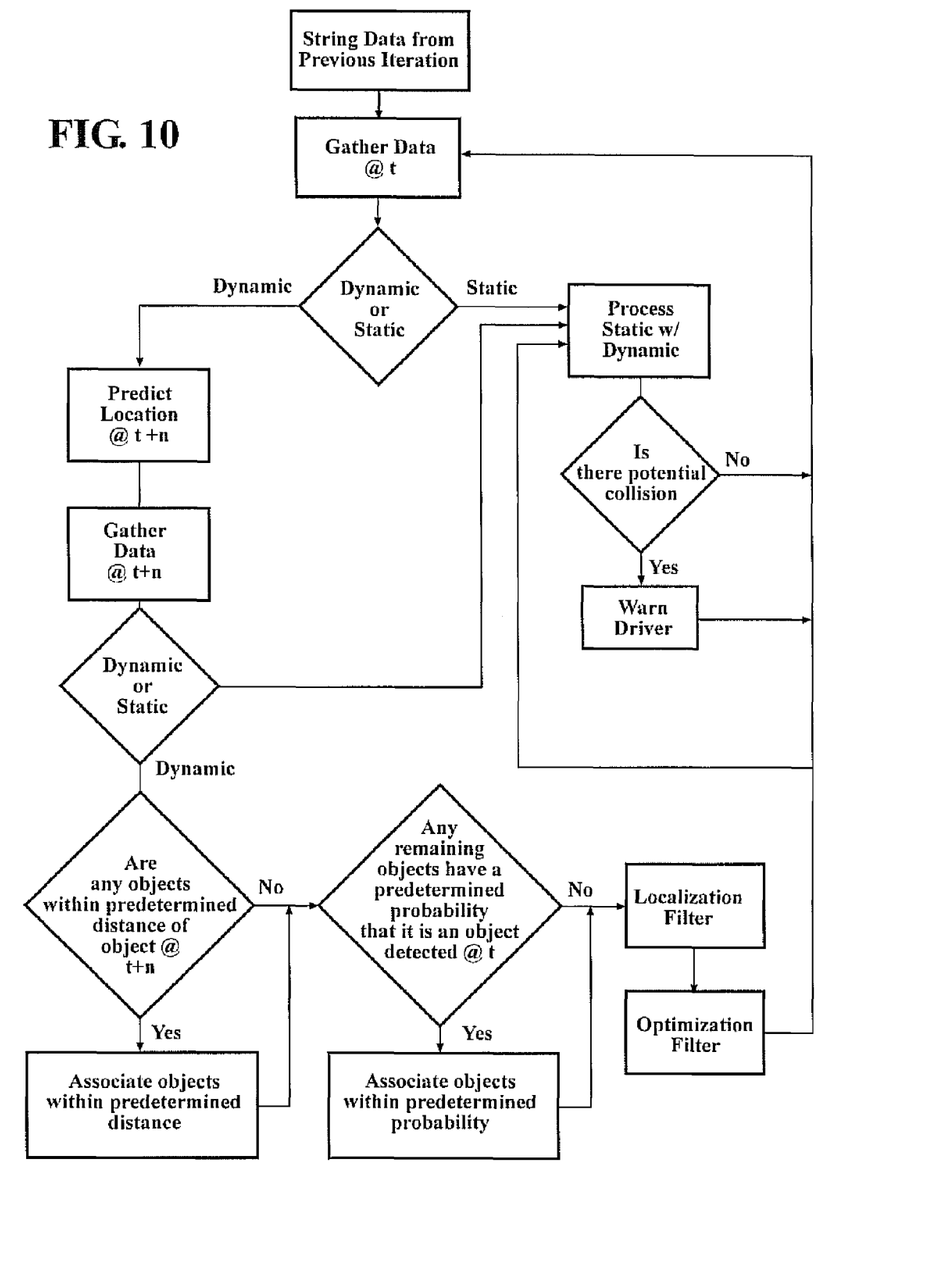
FIG. 10 is a diagram showing a method of object detection and tracking according to the present invention.

With reference now to FIG. 10, a method for tracking objects is provided. The method begins by storing data from previous iterations so as to define a first object group, and gathering data related to objects at predetermined intervals of time so as to detect a second object group gathering data from the previous iteration to generate the first group of dynamic objects. The data supporting an object is processed so as to classify the object as being either dynamic or static. The predicted location of dynamic objects at a future time is then made. Subsequently, data gathering may be done through the use of a sensor 20 and relates to the detection of an object wherein the objects are again classified as being either dynamic or static.

The objects are then processed using a association wherein any objects within the predetermined distance of a predicted object are associated with that object. A second association is made using the probability that a new object is one of the previously detected objects. The probability is based upon the probability that the newly detected objects match the predicted location of any one of the previously detected objects.

The remaining unassociated objects are then localized so as to reduce the size of the matrix prior to performing or processing the objects through an optimization filter 12. Localization may be done linearly based upon distance or probability. Accordingly the system 10 and method herein provide an object tracking system 10 which is operable to reduce the processing time for tracking objects so as to minimize the requirement of a robust processor 18 or a relatively large storage medium. The system 10 and method does this by utilizing associations between newly detected objects and previously detected objects.

The tracked objects may be integrated into a collision warning system 10, whereby information regarding the tracked objects is processed so as to generate a warning when a collision is predicted. Such systems 10 are currently known and used in the art.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

We claim:

1. An object detection system configured to minimize processing time for tracking objects, the object detection system comprising:
    a memory storage system configured to store detected objects from a previous iteration so as to define a first object group of dynamic objects at the beginning of a predetermined interval;
    a sensor configured to detect objects in a predetermined geographic area at the predetermined interval so as to define a second object group detected at the end of the predetermined interval;
    a processor in communication with the sensor, the processor configured to determine which of the objects are dynamic and to predict a location for each of the dynamic objects in the first object group at the end of the predetermined interval; and
    a pair of filters configured to associate the dynamic objects from the first object group with the dynamic objects from the second object group so as to track the dynamic objects, an optimization filter, and a processing filter, the processor processing the predicted location of dynamic objects from the first object group and dynamic objects from the second object group through the pair of filters, the processor first executing one of the pair of filters so as to associate objects from the second object group with a corresponding dynamic object from the first object group when the predicted location is within a predetermined distance of each other, and the processor subsequently executing the other of the pair of filters so as to each of the dynamic objects from the first object group with one of the corresponding objects in the second object group when the probability that the dynamic object from the second object group is the dynamic object from the first object group is greater than a predetermined probability, the optimization filter associating the unassociated dynamic objects from the first object group with the unassociated dynamic objects from the second object group, the processing filter reconfigured to sort the unassociated dynamic objects from the second object group into a plurality of discrete categories, the optimization filter filtering each of plurality of discrete categories independently so as to associate the unassociated dynamic objects from the second object group with dynamic objects from the first object group.

2. The object detection system as set forth in claim 1, wherein one of the plurality of discrete categories includes unassociated objects located within a predetermined distance of the predicted location of dynamic objects from the first object group.

3. The object detection system as set forth in claim 1, further including a segmentation module, the segmentation module associating data from objects detected in the first object group with objects detected in the second object group when the predicted location of objects in the first object groups are within a predetermined distance of detected objects in the second object group.

4. The object detection system as set forth in claim 1, further including a counting module, the counting module configured to discard one of the unassociated dynamic objects from the first object group after a predetermined number of predetermined intervals.

5. The object detection system as set forth in claim 4, wherein the predetermined number of predetermined intervals is related to the number of times the dynamic object was associated.

6. The object detection system as set forth in claim 1, further including a mapping module configured to associate each object with a grid coordinate.

7. The object detection system as set forth in claim 1, further including an association matrix, the association matrix having an artificial dynamic object for each of the unassociated dynamic objects from the first and second object groups.

8. Method of tracking objects comprising the steps of:
    storing data from previous iterations so as to define a first object group;
    gathering data related to objects at predetermined intervals of time so as to detect a second object group;
    processing the data so as to classify an object as being either dynamic or static;
    predicting the location of dynamic objects in the first object group; and
    associating objects from the first object group with objects from the second object group, wherein the remaining unassociated objects are associated with each other using an optimization filter.

9. The method as set forth in claim 8, wherein an object from the second object group is associated with an object from the first object group when the object from the second object group is within a predetermined distance of the predicted location of the object from the first object group.

10. The method as set forth in claim 8, wherein an object from the second object group is associated with an object from the first object group when the probability that the object from the second object group is an object from the first object group, is above a predetermined probability.

11. The method as set forth in claim 8, further including the step of localizing the remaining unassociated objects so as to form discrete matrices, and processing the discrete matrices using the optimization filter.

12. The method as set forth in claim 11, wherein localization is performed using association.

13. The method as set forth in claim 12, wherein the association is based upon distance.

14. The method as set forth in claim 12, wherein the association is based upon probability.

15. An object detection system configured to minimize processing time for tracking objects, the object detection system comprising:

a memory storage system used for storing detected objects from a previous iteration so as to define a first object group of dynamic objects at the beginning of a predetermined interval;

a sensor configured to detect objects in a predetermined geographic area at the predetermined interval so as to define a second object group detected at the end of the predetermined interval;

a processor in communication with the sensor, the processor configured to determine which of the objects are dynamic and to predict the location for each of the dynamic objects in the first object group at the end of the predetermined interval; and a pair of filters configured to associate the dynamic objects from the first object group with the dynamic objects from the second object group so as to track the dynamic objects, the processor processing the predicted location of dynamic objects from the first object group and dynamic objects from the second object groups through the pair of filters, the processor first executing one of the pair of filters, associating objects from the second object group with a corresponding dynamic object from the first object group when the predicted location is within a predetermined distance of each other, the processor subsequently executing the other of the pair of filters, associating each of the dynamic objects from the first object group with one of the corresponding objects in the second object group when the probability that the dynamic object from the second object group is the dynamic object from the first object group is greater than a predetermined probability, the processor further configured to sort unassociated dynamic objects from the second object group into a plurality of discrete categories, and processes each of the plurality of discrete categories independently so as to associate the unassociated objects from the second object group with dynamic objects from the first object group.

\* \* \* \* \*